(12) United States Patent
Mizobuchi et al.

(10) Patent No.: US 7,899,593 B2
(45) Date of Patent: Mar. 1, 2011

(54) AUTOMATIC TRANSMISSION ABNORMALITY DIAGNOSIS APPARATUS AND METHOD

(75) Inventors: Masayasu Mizobuchi, Aichi-gun (JP); Kei Kitajima, Toyota (JP); Naoyuki Sakamoto, Redondo Beach, CA (US)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 631 days.

(21) Appl. No.: 12/020,833

(22) Filed: Jan. 28, 2008

(65) Prior Publication Data

US 2008/0183352 A1 Jul. 31, 2008

(30) Foreign Application Priority Data

Jan. 29, 2007 (JP) ............................... 2007-017789

(51) Int. Cl.
*G06F 19/00* (2006.01)
(52) U.S. Cl. .......................................... 701/35; 701/51
(58) Field of Classification Search ................... 701/29, 701/35, 51, 62; 477/34, 121, 125, 127, 130
See application file for complete search history.

(56) References Cited

U.S. PATENT DOCUMENTS

| | | | | |
|---|---|---|---|---|
| 4,729,461 A | * | 3/1988 | Nishikawa et al. | 192/3.31 |
| 5,046,175 A | * | 9/1991 | Lentz et al. | 701/62 |
| 5,527,233 A | * | 6/1996 | Tabata et al. | 477/62 |
| 5,599,254 A | * | 2/1997 | Tomisawa et al. | 477/176 |
| 5,609,067 A | * | 3/1997 | Mitchell et al. | 74/336 R |
| 5,721,682 A | * | 2/1998 | Arai et al. | 701/67 |
| 5,916,293 A | * | 6/1999 | Katakura et al. | 701/67 |
| 6,125,316 A | * | 9/2000 | Sasaki et al. | 701/62 |
| 6,459,979 B2 | * | 10/2002 | Murakami | 701/54 |
| 7,643,924 B2 | * | 1/2010 | Kawamura et al. | 701/62 |

FOREIGN PATENT DOCUMENTS

| | | |
|---|---|---|
| JP | 04-290673 A | 10/1992 |
| JP | 07-167286 A | 7/1995 |
| JP | 7-167287 A | 7/1995 |
| JP | 7-239026 A | 9/1995 |
| JP | 08-105536 A | 4/1996 |
| JP | 08-128523 A | 5/1996 |
| JP | 11-280886 A | 10/1999 |
| JP | 2000-240784 A | 9/2000 |

* cited by examiner

*Primary Examiner*—Thomas G Black
*Assistant Examiner*—Ce Li
(74) *Attorney, Agent, or Firm*—Sughrue Mion, PLLC

(57) ABSTRACT

Provided are an automatic transmission abnormality diagnosis apparatus and method for an automatic transmission having: a lock-up mechanism; a shift mechanism; and a control mechanism. The automatic transmission is adapted to operate in a slip state, a full lock-up state or a lock-up release state of the lock-up mechanism. The lock-up mechanism is forcibly shifted from the slip state or from the lock-up release state to the full lock-up state in an operation region where the lock-up mechanism is not normally placed in the full lock-up state, and then whether the forcible shift of the lock-up mechanism has been successfully performed is determined. As such, the region for executing the abnormality diagnosis of the hydraulic control mechanism is extended and thus the frequency of the abnormality diagnosis increases, and therefore abnormalities can be promptly detected.

6 Claims, 7 Drawing Sheets

AUTOMATIC TRANSMISSION ABNORMALITY DIAGNOSIS APPARATUS AND METHOD

INCORPORATION BY REFERENCE

The disclosure of Japanese Patent Application No. 2007-017789 filed on Jan. 29, 2007, including the specification, drawings and abstract is incorporated herein by reference in its entirety.

BACKGROUND OF THE INVENTION

1. Field of the Invention

The invention relates to an abnormality diagnosis apparatus and an abnormality diagnosis method, and in particular the invention relates to an abnormality diagnosis apparatus and an abnormality diagnosis method for automatic transmissions used in vehicles.

2. Description of the Related Art

Conventionally, automatic transmissions are provided with a torque converter having a lock-up mechanism, a shift mechanism constituted of a plurality of gears and frictional elements, and a hydraulic pressure control mechanism that hydraulically controls the torque converter and the shift mechanism. Conventionally, automatic transmissions operate in: a slip state which is established in a slip region and in which the input shaft and the output shaft of the torque converter are mechanically coupled with each other such that they rotate relative to each other (will hereinafter be referred to as "flexible lock-up state); a full lock-up state which is established in a full lock-up region and in which the input shaft and the output shaft of the torque converter are mechanically coupled with each other such that they rotate together; and a lock-up release state which is established in a lock-up release region and in which the input shaft and the output shaft of the torque converter are released from each other. Further, conventionally, automatic transmissions are adapted to change the apply state of the lock-up mechanism and the shift state of the shift mechanism using the hydraulic pressure control mechanism that operates under the control of an ECU.

An automatic transmission abnormality diagnosis apparatus has been proposed which performs an abnormality diagnosis of a hydraulic pressure control mechanism such as the one described above (For example, refer to Japanese Patent Application Publication No. 07-167287 (JP-A-07-167287)). According to automatic transmission abnormality diagnosis apparatus described in JP-A-07-167287, in a predetermined lock-up region in which the input shaft and the output shaft of the torque converter are mechanically coupled with each other, a transmission ECU measures the slippage between the input shaft and the output shaft of the lock-up mechanism, and then the transmission ECU diagnoses, based on the measurement result, whether the lock-up mechanism is being properly controlled by the hydraulic pressure control mechanism.

According to the automatic transmission diagnosis apparatus described above, however, because the abnormality diagnosis is performed only in the predetermined lock-up region where the input shaft and the output shaft of the torque converter are mechanically coupled with each other, the frequency of the abnormality diagnosis is low, and therefore abnormalities can not be detected promptly.

SUMMARY OF THE INVENTION

In view of the above, the invention has been made to provide an automatic transmission abnormality diagnosis apparatus and method that increase the frequency of the abnormality diagnosis of the automatic transmission by extending the region for performing the same diagnosis so that abnormalities can be promptly detected.

To achieve this object, an aspect of the invention relates to an automatic transmission abnormality diagnosis apparatus for an automatic transmission having: a lock-up mechanism that mechanically couples an input shaft and an output shaft of a torque converter; a shift mechanism that changes the rotation speed of the output shaft of the torque converter; and a control mechanism that controls the lock-up mechanism and the shift mechanism, the automatic transmission being adapted to operate in: a slip state which is established in a slip region and in which the input shaft and the output shaft of the torque converter are mechanically coupled with each other such that the input shaft and the output shaft of the torque converter rotate relative to each other; a full lock-up state which is established in a full lock-up region and in which the input shaft and the output shaft of the torque converter are mechanically coupled with each other such that the input shaft and the output shaft of the torque converter rotate together; and a lock-up release state which is established in a lock-up release region and in which the input shaft and the output shaft of the torque converter are released from each other. This automatic transmission abnormality diagnosis apparatus includes: a forcing portion that forcibly shifts the lock-up mechanism from the slip state or from the lock-up release state to the full lock-up state in an operation region where the lock-up mechanism is not normally placed in the full lock-up state; and a first determination portion that determines whether the forcible shift of the lock-up mechanism has been successfully performed.

Another aspect of the invention relates to an automatic transmission abnormality diagnosis method for an automatic transmission having: a lock-up mechanism that mechanically couples an input shaft and an output shaft of a torque converter; a shift mechanism that changes the rotation speed of the output shaft of the torque converter; and a control mechanism that controls the lock-up mechanism and the shift mechanism, the automatic transmission being adapted to operate in: a slip state which is established in a slip region and in which the input shaft and the output shaft of the torque converter are mechanically coupled with each other such that the input shaft and the output shaft of the torque converter rotate relative to each other; a full lock-up state which is established in a full lock-up region and in which the input shaft and the output shaft of the torque converter are mechanically coupled with each other such that the input shaft and the output shaft of the torque converter rotate together; and a lock-up release state which is established in a lock-up release region and in which the input shaft and the output shaft of the torque converter are released from each other. This automatic transmission abnormality diagnosis method includes: forcibly shifting the lock-up mechanism from the slip state or from the lock-up release state to the full lock-up state in an operation region where the lock-up mechanism is not normally placed in the full lock-up state; and determining whether the forcible shift of the lock-up mechanism has been successfully performed.

According to the automatic transmission abnormality apparatus and method described above, because the abnormality diagnosis of the control mechanism is performed through the forcible lock-up operation even when the vehicle is not in the full lock-up region, the frequency of the abnormality diagnosis increases, and therefore abnormalities of the control mechanism can be more promptly detected.

Further, the automatic transmission abnormality apparatus and method described above may be such that: whether the lock-up mechanism has failed to be shifted from the full lock-up state to the slip state is determined; the number of times the lock-up mechanism has failed to be shifted from the full lock-up state to the slip state is counted; and the lock-up mechanism is forcibly shifted from the slip state to the full lock-up state in response to the counted number exceeding an allowable value.

In the above case, the abnormality diagnosis of the control mechanism is performed through the forcible lock-up operation also when the lock-up mechanism has failed to be shifted for the full-lock state to the deceleration flexible lock-up state. Therefore, the frequency of the abnormality diagnosis increases, and thus abnormalities of the control mechanism can be more promptly detected.

Further, the automatic transmission abnormality apparatus and method described above may be such that: the counted number is reset when the lock-up mechanism has been shifted from the slip state to the full lock-up state in the full lock-up region.

That is, when the lock-up mechanism can be properly placed in the full lock-up state, it indicates that the lock-up mechanism has no abnormality, and therefore in this case the abnormality diagnosis is finished without performing the forcible lock-up operation. Thus, the automatic transmission abnormality apparatus and method described above can minimize or eliminate the influence that execution of the forcible lock-up operation may cause on the driveability.

Further, the automatic transmission abnormality apparatus and method may be such that: whether the actual speed ratio achieved at the shift mechanism is equal to or lower than a command value issued from a shift controller for controlling the shifting of the automatic transmission is determined; and the lock-up mechanism is forcibly shifted from the slip state or from the lock-up release state to the fall lock-up state if the accrual speed ratio is determined not to be equal to nor lower than the command value.

In the above case, because the abnormality diagnosis of the control mechanism is performed through the forcible lock-up operation also when the actual speed ratio at the shift mechanism is deviating from the command value, the frequency of the abnormality diagnosis increases and therefore abnormalities of the control mechanism can be more promptly detected.

Further, the automatic transmission abnormality apparatus and method may be such that: the control mechanism has (i) a first solenoid that drives a common valve that is shared by a shift operation hydraulic pressure control circuit for controlling the shift mechanism and a lock-up hydraulic pressure control circuit for controlling the lock-up mechanism, (ii) a second solenoid that controls the hydraulic pressure of the shift operation hydraulic pressure control circuit, and (iii) a third solenoid that controls the hydraulic pressure of the lock-up hydraulic pressure control circuit; and which of the first solenoid and the second solenoid has an abnormality is detected based on the result of the determination as to whether the forcible shift of the lock-up mechanism has been successfully performed.

In the above case, when the actual speed ratio at the shift mechanism is deviating from the command value, which of the first solenoid, which drives the common valve shared by the shift operation hydraulic pressure control circuit and the lock-up hydraulic pressure control circuit, and the second solenoid, which controls the hydraulic pressure of the shift operation hydraulic pressure control circuit, has an abnormality can be determined.

Further, the automatic transmission abnormality apparatus and method may be such that: the forcibly established full lock-up state of the lock-up mechanism is cancelled immediately after the end of the determination as to whether the forcible shift of the lock-up mechanism has been successfully performed.

In the above case, because the forcible lock-up operation is finished immediately after the determination as to whether the forcible shift of the lock-up mechanism has been successfully performed, the influence that execution of the forcible lock-up operation may cause on the driveability can be minimized or eliminated.

As such, the automatic transmission abnormality apparatus and method of the invention perform the abnormality diagnosis at an increased frequency and thus accomplish prompt detection of abnormalities by executing the forcible lock-up operation when the vehicle is not in the full lock-up state.

BRIEF DESCRIPTION OF THE DRAWINGS

The features, advantages thereof, and technical and industrial significance of this invention will be better understood by reading the following detailed description of preferred embodiments of the invention, when considered in connection with the accompanying drawings, in which.

DETAILED DESCRIPTION OF THE EMBODIMENTS

In the following description and the accompanying drawings, the present invention will be described in more detail with reference to example embodiments.

Figure 1:
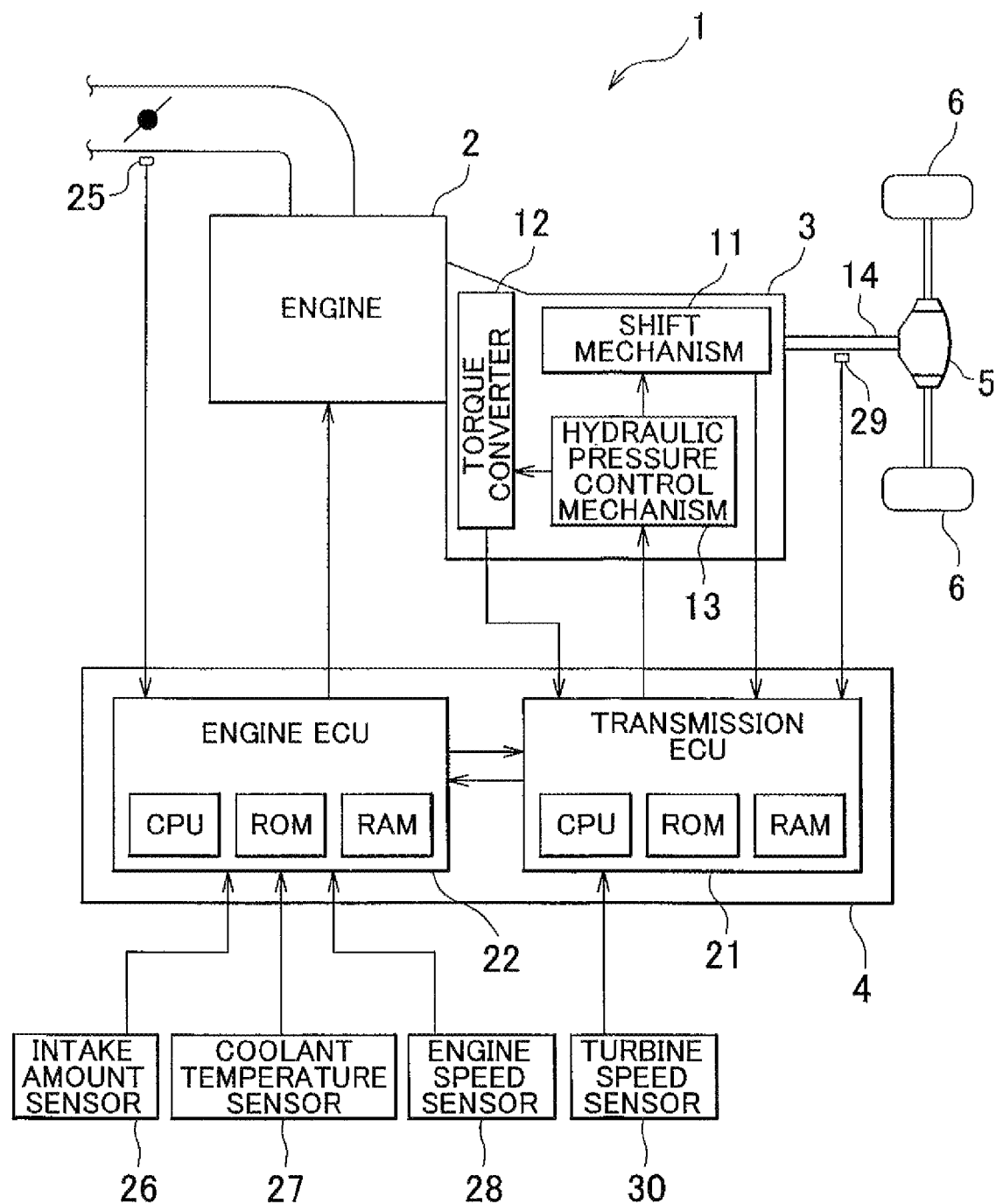
FIG. 1 is a view schematically showing the configuration of a vehicle incorporating an automatic transmission abnormality diagnosis apparatus according to an example embodiment of the invention.
Figure 2:
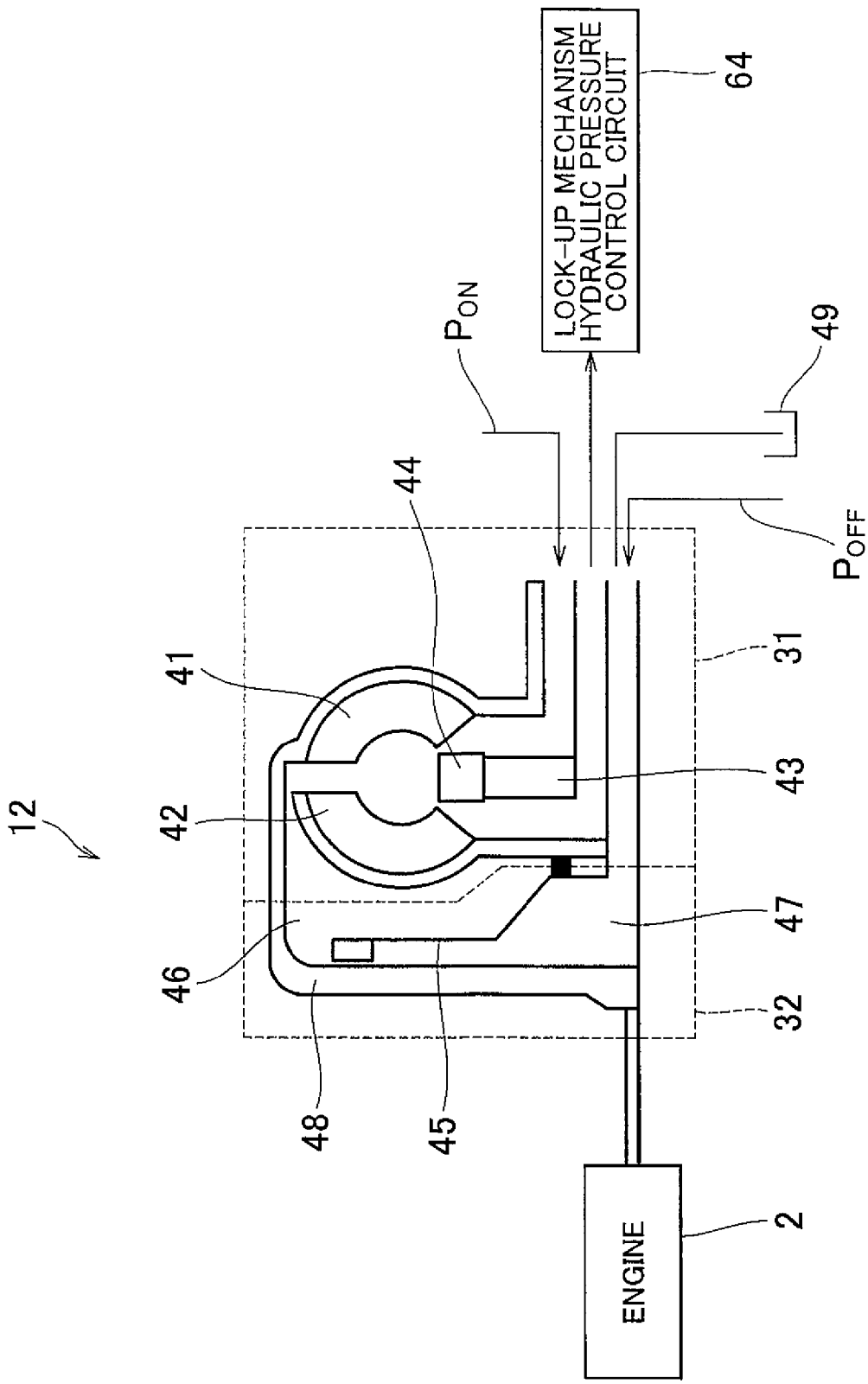
FIG. 2 is a view schematically showing the structure of a torque converter of the automatic transmission abnormality diagnosis apparatus of the example embodiment.

Hereinafter, an example embodiment of the invention will be described with reference to the drawings. FIG. 1 is a view schematically showing the configuration of a vehicle incorporating an automatic transmission abnormality diagnosis apparatus according to the example embodiment of the invention. FIG. 2 is a view schematically showing the structure of a torque converter of the automatic transmission abnormality diagnosis apparatus of the example embodiment.

Referring to FIG. 1, a vehicle 1 has an engine 2 that is an internal combustion engine, an automatic transmission 3 that transmits the rotational torque output from the engine 2 to drive wheels 6 (rear wheels) via a differential 5, and an electronic control device 4 for controlling the engine 2 and the automatic transmission 3. While the automatic transmission abnormality diagnosis apparatus of this example embodiment is provided in a rear-drive vehicle, the invention is not limited to applications in rear-drive vehicles.

The automatic transmission 3 has a shift mechanism 11 adapted to establish multiple speeds, a torque converter 12 that transmits the torque input from the engine 2 to the shift mechanism 11 at a given torque ratio, and a hydraulic pressure control mechanism 13 that hydraulically controls the shift mechanism and the torque converter 12. The output shaft of the shift mechanism 11 is connected to the differential 5 via a propeller shaft 14, and the drive power output from the shift mechanism 11 is transferred to the drive wheels 6 via the propeller shaft 14 and the differential 5.

The electronic control device 4 has a transmission ECU 21 for controlling the automatic transmission 3 and an engine ECU 22 for controlling the engine 2.

The engine ECU 22 is constituted of a CPU (Central Processing Unit), a RAM (Random Access Memory), a ROM (Read Only Memory), an input interface, and an output interface. The engine ECU 22 outputs various engine control signals to the engine 2 so that the engine 2 operates according to the operation amount of an accelerator pedal, which is not shown in the drawings.

The engine ECU 22 receives various signals transmitted from a throttle sensor 25 that detects the opening degree of the throttle of the engine 2, an intake amount sensor 26 that detects the amount of the intake air drawn into the engine 2, a coolant temperature sensor 27 that detects the temperature of the engine coolant, an engine speed sensor that detects the engine speed Ne, etc.

The transmission ECU 21 is constituted of a CPU, a RAM, a ROM, an input interface, and an output interface. The ROM stores various maps including a shift-curve map defined by the vehicle speed and the throttle opening degree, various programs for controlling the shift operation of the automatic transmission 3, and the like.

The transmission ECU 21 receives, from the engine ECU 22, various data regarding the opening degree of the throttle of the engine 2, the amount of intake air drawn into the engine 2, the temperature of the engine coolant, and the engine speed Ne. Also, the transmission ECU 21 receives the output signal of a turbine speed sensor 30 for detecting the rotation speed Nt of the output shaft of the torque converter 12 (will hereinafter be referred to as "turbine speed Nt"), the output signals of a vehicle speed sensor 29 for detecting the rotation speed of the propeller shaft 14, and so on.

The CPU of the transmission ECU 21 controls the speed established at the shift mechanism 11 and the line pressure using the hydraulic pressure control mechanism 13 by processing the input data regarding the throttle opening degree, the vehicle speed, etc., based on various data and programs stored in the ROM.

The shift mechanism 11 is constituted of a plurality of planetary gearsets and various frictional elements for controlling the rotation of each rotational element of the planetary gearsets. The hydraulic pressure control mechanism 13 changes the rotation speed ratio between the input shaft and the output shaft of the shift mechanism 11 by selectively engaging and disengaging the frictional elements using given hydraulic pressures that are obtained from the line pressure as the base pressure, so that the automatic transmission 3 shifts from one speed to the other speed. The friction elements include clutch elements, brake elements, one-way clutch elements, and the like.

The torque converter 12 is provided between the engine 2 and the shift mechanism 11. Referring to FIG. 2, the torque converter 12 is constituted of a fluid coupling portion 31 and a lock-up mechanism 32. The lock-up mechanism 32 is used to improve the efficiency of power transfer from the engine 2 to the shift mechanism 11. The engine 2 and the torque converter 12 are connected to each other via the input shaft of the lock-up mechanism 32, and the torque converter 12 and the shift mechanism 11 (Refer to FIG. 1) are connected to each other via the output shaft of the torque converter 12.

The fluid coupling portion 31 is constituted of a pump impeller 41 connected to the input shaft of the lock-up mechanism 32, a turbine runner 42 connected to the input shaft 11, and a stator 44 having a one-way clutch 43. The pump impeller 41 and the turbine runner 42 each have a plurality of guide fins. The inside of the fluid coupling portion 31 is filled up with hydraulic fluid.

The pump impeller 41 is connected to the output shaft of the engine 2 via the input shaft of the lock-up mechanism 32, and it therefore rotates together with the output shaft of the engine 2. As the pump impeller 41 rotates, the guide fins of the pump impeller 41 makes the hydraulic fluid in the fluid coupling portion 31 flow in one direction, and this hydraulic fluid flow urges the guide fins of the turbine runner 42, whereby the turbine runner 42 rotates.

The pump impeller 41 and the turbine runner 42 are not mechanically connected to each other, but they are connected via hydraulic fluid. Therefore, when the vehicle 1 is not moving, the pump impeller 41 rotates while the turbine runner 42 is stopped, whereby the power transfer from the engine 2 to the shift mechanism 11 is interrupted.

When the vehicle 1 is traveling at a high speed, the lock-up mechanism 32 mechanically couple the input shaft and the output shaft of the torque converter 12 in order to improve the efficiency of power transfer from the engine 2 and the shift mechanism 11. The lock-up mechanism 32 includes a front cover 48 of the torque converter 12 that is connected to the output shaft of the engine 2, a lock-up clutch 45 that is used to couple the front cover 48 and the turbine runner 42 together, an apply side hydraulic chamber 46 to which the hydraulic fluid is supplied when applying the lock-up clutch 45, and a release side hydraulic chamber 47 to which the hydraulic fluid is supplied when releasing the lock-up clutch 45.

The release side hydraulic chamber 47 is defined by the lock-up clutch 45 and the front cover 48, and the apply side hydraulic chamber 46 is defined by the lock-up clutch 45 and the turbine runner 42. The apply side hydraulic chamber 46 and the release side hydraulic chamber 47 are partitioned from each other across the lock-up clutch 45.

The transmission ECU 21 adjusts the hydraulic pressures in the apply side hydraulic chamber 46 and in the release side hydraulic chamber 47 via the hydraulic pressure control mechanism 13 to selectively place the lock-up clutch 45 in a lock-up state where the lock-up clutch 45 and the front cover 48 are coupled with each other or in a released state where the lock-up clutch 45 and the front cover 48 are released from each other. The hydraulic pressure control mechanism 13 has a lock-up relay valve 73, which will be described later. Hydraulic fluid is selectively supplied to the apply side hydraulic chamber 46 or to the release side hydraulic chamber 47 of the lock-up clutch 45 depending upon whether the lock-up relay valve 73 is on or off.

For example, when the hydraulic pressure control mechanism 13 is coupling the lock-up clutch 45 to the front cover 48 under the control of the transmission ECU 21, the lock-up relay valve 73 (Refer to FIG. 3) is turned on, whereby hydraulic fluid having a line pressure PON is supplied to the apply side hydraulic chamber 46. The supplied line pressure PON moves the lock-up clutch 45 so that the lock-up clutch 45 and the front cover 48 are coupled with each other via a friction material.

On the other hand, when the hydraulic pressure control mechanism 13 is releasing the lock-up clutch 45 under the control of the transmission ECU 21, the lock-up relay valve 73 (Refer to FIG. 3) is turned of, whereby hydraulic pressure having a line pressure POFF is supplied to the release side hydraulic chamber 47 and the hydraulic pressure in the apply side hydraulic chamber 46 is drained to a drain 49.

In this example embodiment, a flexible lock-up state control is executed in which the transmission ECU 21 adjusts the hydraulic pressures in the apply side hydraulic chamber 46 and the release side hydraulic chamber 47 via the hydraulic pressure control mechanism 13 so as to place the lock-up clutch 45 in a flexible lock-up state where the lock-up clutch 45 and the front cover 48 remain coupled while slipping on each other at a given slip rate.

The flexible lock-up state of the lock-up clutch 45 is defined as flexible lock-up regions in a map stored in the ROM of the transmission ECU 21, and an acceleration flexible lock-up control and a deceleration flexible lock-up control are executed according to this map as will be described below.

With regard to the acceleration flexible lock-up control, in the map stored in the ROM of the transmission ECU 21, the flexible lock-up region for the acceleration flexible lock-up control is defined as a region corresponding to a vehicle speed range that ranges from a given lower limit speed and corresponding to a throttle opening degree range that ranges form a given lower limit opening degree. The transmission ECU 21 determines, based on the vehicle speed and the throttle opening degree, whether the vehicle 1 is presently in the flexible lock-up region for the acceleration flexible lock-up control. If it is determined that the vehicle 1 has entered the flexible lock-up region, the transmission ECU 21 adjusts the pressure at which to couple the lock-up clutch 45 to the front cover 48 by controlling, via the hydraulic pressure control mechanism 13, the hydraulic pressures in the release side hydraulic chamber 47 and the apply side hydraulic chamber 46 such that the difference between the engine speed Ne and the turbine speed Nt falls in a particular range.

When the vehicle 1 is accelerating within a speed range above, for example, 60 km/h, if the lock-up clutch 45 and the front cover 48 are fully coupled with each other, a booming noise occurs in the vehicle 1, and therefore the NV (Noise and Vibration) characteristic of the vehicle 1 deteriorates. Thus, in order to prevent such a booming noise while making the efficiency of torque transfer from the engine 2 to the shift mechanism 11 higher than normally achieved at the torque converter 12 during acceleration of the vehicle 1, the transmission ECU 21 executes the acceleration flexible lock-up control that places the lock-up clutch 45 in the flexible lock-up state.

Meanwhile, with regard to the deceleration flexible lock-up control, in the map stored in the ROM of the transmission ECU 21, the flexible lock-up region for the deceleration flexible lock-up control is defined as a region corresponding to a given high vehicle speed range and corresponding to a throttle opening degree indicating the fully-closed state of the throttle. When the vehicle 1 is decelerating within a speed range above, for example, 60 km/h, the vehicle 1 is determined to be in the flexible lock-up region for the deceleration flexible lock-up control, and the transmission ECU 21 then controls the hydraulic pressure control mechanism 13 to shift the lock-up clutch 45 from the full lock-up state to the flexible lock-up state.

The supply of fuel to the engine 2 is interrupted in response to the accelerator pedal being released, and the supply of fuel to the engine 2 is restarted in response to the engine speed Ne decreasing down to a given threshold.

If the deceleration flexible lock-up control is executed while the vehicle 1 is decelerating with the fuel supply being temporarily interrupted as described above, it causes the engine speed Ne to decrease substantially in proportion to the turbine speed Nt. As such, when the accelerator pedal is released while the vehicle 1 is running at a high speed, the engine speed does not sharply drop unlike when the deceleration flexible lock-up control is not executed, which delays the restart of the fuel supply to the engine 2, thus improving the fuel economy of the vehicle 1.

When the shift mechanism 11 is to be shifted, when it is determined based on the signals from the brake sensor that the brake pedal has been depressed, or when it is determined based on the signals input from the hydraulic temperature sensor that the temperature of hydraulic fluid in the automatic transmission 3 has exceeded a reference temperature, the transmission ECU 21 shifts the lock-up mechanism 32 from the full lock-up state or from the flexible lock-up state to the release state by decoupling the lock-up clutch 45 from the front cover 48.

In order to execute the deceleration flexible lock-up control and the acceleration flexible lock-up control described above, the hydraulic pressure control mechanism 13 includes a duty solenoid (DSL) 74 (Refer to FIG. 3) that produces signal pressures for placing the lock-up clutch 45 in the flexible lock-up state and a lock-up pressure regulator valve 72 that adjusts the hydraulic pressures in the apply side hydraulic chamber 46 and the in the release side hydraulic chamber 47 in accordance with the pressure signals output from the duty solenoid (DSL) 74.

That is, the duty solenoid (DSL) 74 produces, under the control of the transmission ECU 21, signal pressures based on the engine speed Ne, the turbine speed Nt, the throttle opening degree, and the vehicle speed, and the lock-up pressure regulator valve 72 (Refer to FIG. 3) adjusts the coupling pressure of the lock-up clutch 45 against the front cover 48, in accordance with the signal pressure output from the duty solenoid (DSL) 74.

Figure 3:
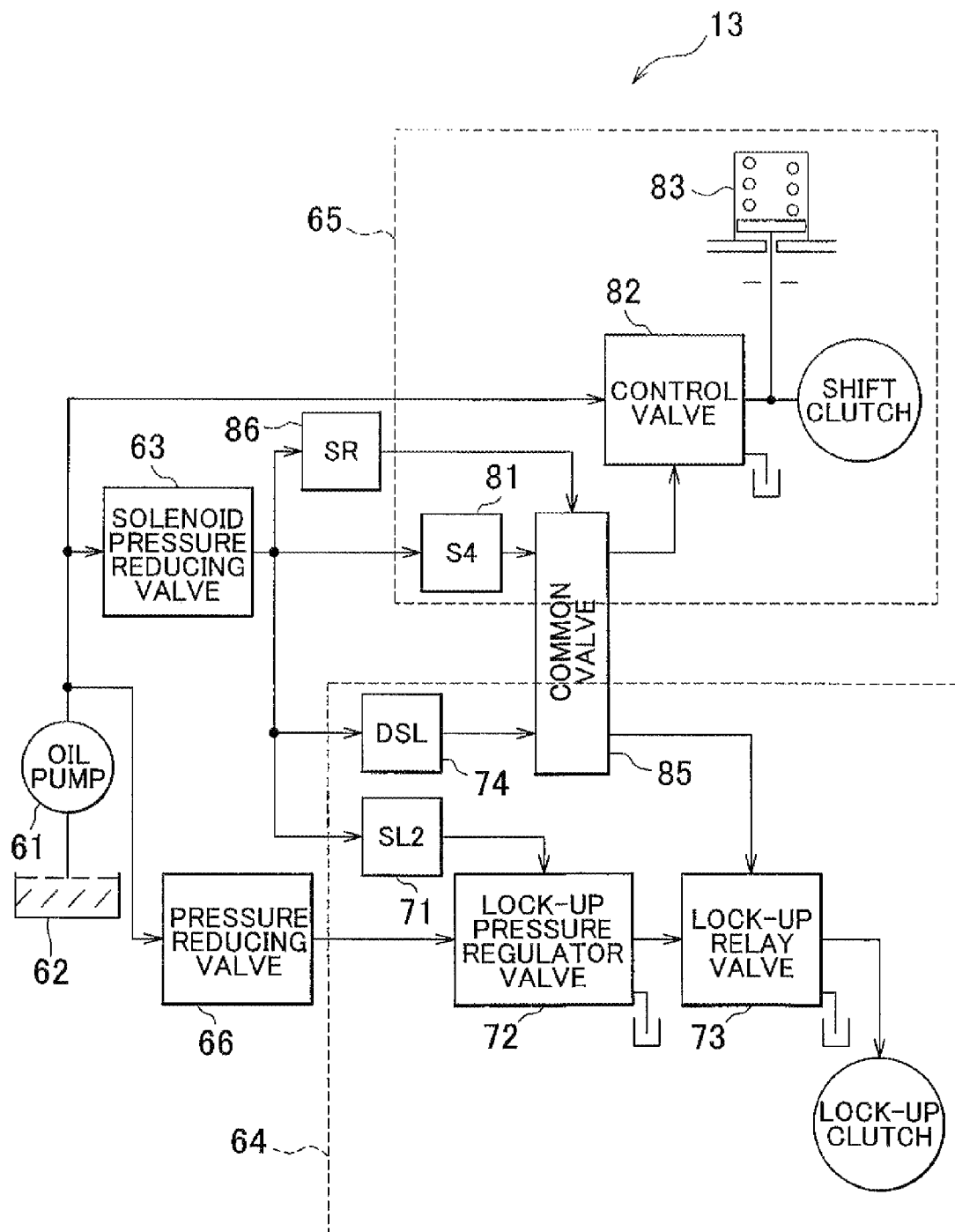
FIG. 3 is a diagram schematically showing the configuration of the hydraulic pressure control mechanism of the automatic transmission abnormality diagnosis apparatus of the example embodiment.

FIG. 3 is a view schematically showing the configuration of the hydraulic pressure control mechanism of the automatic transmission abnormality diagnosis apparatus of the example embodiment. In this example embodiment, the hydraulic pressure control mechanism 13 is configured to control the shift mechanism 11 that is constituted of a main shift portion and a sub-shift portion. However, the shift mechanism may be constituted of a main shift portion only, and in this case, the hydraulic pressure control mechanism 13 may be configured to control the main shift portion.

Referring to FIG. 3, the hydraulic pressure control mechanism 13 is constituted of: an oil pump 61 that produces the base pressure of the hydraulic fluid; an oil pan 62 that has a strainer, not shown in the drawings, and serves as an oil tank; a solenoid pressure reducing valve 63 that reduces the hydraulic fluid base pressure produced by the oil pump 61; a lock-up mechanism hydraulic pressure control circuit 64 that controls the lock-up mechanism 32 including the lock-up clutch 45; a shift operation hydraulic pressure control circuit 65 that controls the shift mechanism 11 including clutches for shift operation (will be referred to as "shift clutches"); and a pressure reducing valve 66, etc.

The lock-up mechanism hydraulic pressure control circuit 64 is constituted of a linear solenoid (SL2) 71, the lock-up regulator valve 72, the lock-up relay valve 73, and the duty solenoid (DSL) 74.

The shift operation hydraulic pressure control circuit 65 is constituted of a transmission solenoid (S4) 81, a control valve 82, and an accumulator 83.

The hydraulic pressure control mechanism 13 further includes a common valve 85 that is shared by the lock-up mechanism hydraulic pressure control circuit 64 and the shift operation hydraulic pressure control circuit 65 and a transmission solenoid (SR) 86 that is used to turn on and off the common valve 85.

The hydraulic fluid that has been returned to the oil pan 62 is distributed, via the oil pump 61, to the solenoid pressure reducing valve 63, to the control valve 82 of the shift operation hydraulic pressure control circuit 65, and to the pressure reducing valve 66.

The pressure of the hydraulic fluid that has been distributed to the solenoid pressure reducing valve 63 is reduced at the solenoid pressure reducing valve 63, and the hydraulic fluid is then distributed to the transmission solenoid (SR) 86, to the linear solenoid (SL2) 71 of the lock-up mechanism hydraulic pressure control circuit 64, to the duty solenoid (DSL) 74 of the lock-up mechanism hydraulic pressure control circuit 64, and to the transmission solenoid (S4) 81 of the shift operation hydraulic pressure control circuit 65.

The lock-up pressure regulator valve 72 of the lock-up mechanism hydraulic pressure control circuit 64 has a port to which the line pressure that has been reduced by the pressure reducing valve 66 is supplied and a portion that receives the signal pressure from the linear solenoid (SL2) 71. When the lock-up regulator valve 72 receives a signal pressure (hydraulic pressure signals) indicating "ON" from the linear solenoid (SL2) 71, the lock-up regulator valve 72 places the pressure reducing valve 66 and the lock-up relay valve 73 in communication. When the lock-up pressure regulator valve 72 receives a signal pressure indicating "OFF" from the linear solenoid (SL2) 71, the lock-up pressure regulator valve 72 connects the lock-up relay valve 73 to the drain. The amount of hydraulic fluid supplied from the oil pump 61 to the lock-up pressure regulator valve 72 is large enough for the lock-up regulator valve 72 to control the lock-up clutch 45.

When receiving a signal pressure indicating "ON" from the common valve 85, the lock-up relay valve 73 of the lock-up mechanism hydraulic pressure control circuit 64 places the lock-up pressure regulator valve 72 and the lock-up mechanism 32 in communication. On the other hand, when receiving a signal pressure indicating "OFF" from the common valve 85, the lock-up relay valve 73 connects the lock-up mechanism 32 to the drain.

The linear solenoid (SL2) 71 produces the hydraulic pressure for controlling the lock-up pressure regulator valve 72, and supplies, in response to the signals from the common valve 85, hydraulic fluid to the lock-up clutch via the lock-up pressure regulator valve 72 and the lock-up relay valve 73.

The transmission solenoid (S4) 81 of the shift operation hydraulic pressure control circuit 65 outputs signal pressures for controlling the control valve 82, and in response to these signal pressures, the control valve 82 applies or releases the shift clutch as needed. For example, when applying the shift clutch, the control valve 82 is turned on by a signal pressure from the transmission solenoid (S4) 81, whereby hydraulic fluid is supplied from the oil pump 61 to the shift clutch. On the other hand, when releasing the shift clutch, the control valve 82 is turned off by a signal pressure from the transmission solenoid (S4) 81, whereby the shift clutch is connected to the drain.

The accumulator 83 is provided between the shift clutch and the control valve 82. The accumulator 83 adjusts, during the shifting of the automatic transmission 3, the line pressure supplied to the shift clutch such that the shifting is smoothly carried out.

The common valve 85 is provided downstream of the duty solenoid (DSL) 74 and the transmission solenoid (S4) 81. The common valve 85 is turned on and off by the transmission solenoid (SR) 86. Therefore, when the common valve 85 is turned on by the signal pressure output from the transmission solenoid (SR) 86, the hydraulic fluid supplied from the transmission solenoid (S4) 81 is input to the control valve 82 via the common valve 85 while the hydraulic fluid supplied from the duty solenoid (DSL) 74 is supplied to the lock-up relay valve 73 via the common valve 85.

Figure 4A:
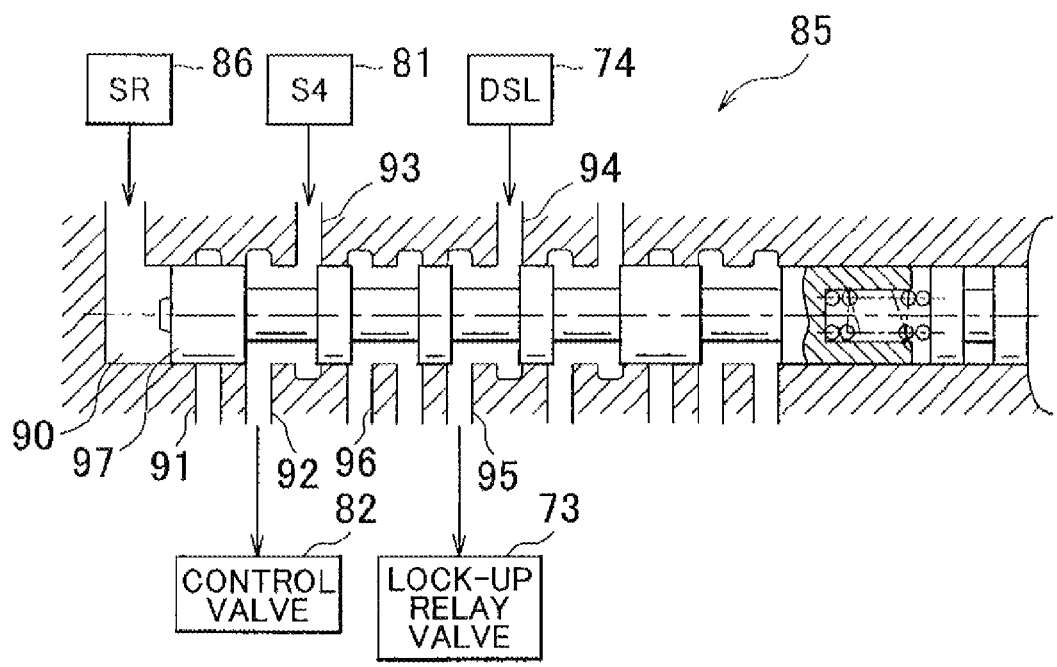
FIG. 4A and FIG. 4B are views illustrating the structure of a common valve in the example embodiment of the invention (FIG. 4A is a cross-sectional view of a portion of the common valve in the "on" state and FIG. 4B is a cross-sectional view of the same portion of the common valve in the "off" state)
Figure 4B:
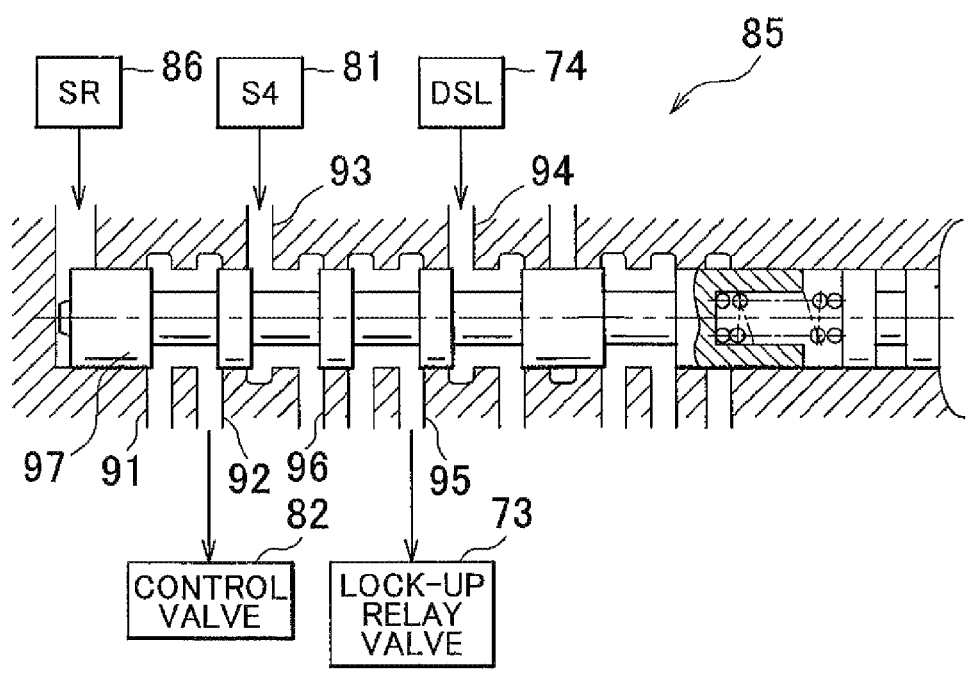

FIG. 4A and FIG. 4B show the structure of the common value 85. FIG. 4A is a cross-sectional view of a portion of the common valve 85 in the "on" state. FIG. 4B is a cross-sectional view of the same portion of the common valve 85 in the "off" state.

Referring to FIG. 4A and FIG. 4B, the common valve 85 has a hydraulic fluid chamber 90 to which the signal pressures are output from the transmission solenoid (SR) 86, ports 91, 96 connected to the drain, a port 92 connected to the control valve 82, a port 93 connected to the transmission solenoid (S4) 81, a port 94 connected to the duty solenoid (DSL) 74, and a port 95 connected to the lock-up relay valve 73.

In response to signal pressures being supplied from the transmission solenoid (SR) 86 to the common valve 85, a spool 97 moves toward the right side in FIG. 4A and FIG. 4B, so that the common valve 85 is placed in the "on" state shown in FIG. 4A. At this time, the port 92 and the port 93 are in communication, and therefore the signal pressures output from the transmission solenoid (S4) 81 are supplied to the control valve 82. In this state, further, the port 94 and the port 95 are in communication, and therefore the signal pressures output from the duty solenoid (DSL) 74 are supplied to the lock-up relay valve 73.

On the other hand, when the signal pressure of the transmission solenoid (SR) 86 is reduced down to the OFF signal pressure indicating "OFF", the spool 97 of the common valve 85 moves, under the urging force of a spring, toward the left side in FIG. 4A and FIG. 4B, whereby the common valve 85 is placed in the "off" state shown in FIG. 4B. At this time, the communication between the port 92 and the port 93 is interrupted, and therefore the signal pressure output from the transmission solenoid (S4) 81 is interrupted and thus it is not supplied to the control valve 82. In this state, further, the communication between the port 94 and the port 95 is interrupted, and therefore the signal pressure output from the duty solenoid (DSL) 74 is interrupted and thus it is not supplied to the lock-up relay valve 73. In this state, on the other hand, the port 91 and the port 92 are in communication and the port 95 and the port 96 are in communication, connecting the control valve 82 and the lock-up relay valve 73 to the drain.

The automatic transmission abnormality diagnosis apparatus of this example embodiment is formed by the transmission ECU 21. In this example embodiment, when the lock-up mechanism 32 has failed to be shifted from the full lock-up state to the deceleration flexible lock-up state and when the speed established at the shift mechanism 11 is different from the speed required by the transmission ECU 21, the automatic transmission abnormality diagnosis apparatus performs an abnormality diagnosis of the hydraulic pressure control mechanism 13 that controls the lock-up mechanism 32 and the shift mechanism 11 as described above.

First, a description will be made of how the abnormality diagnosis of the hydraulic pressure control mechanism 13 is performed when the lock-up mechanism 32 has failed to be shifted from the full lock-up state to the deceleration flexible lock-up state, that is, when a failure of the deceleration flexible lock-up control has occurred.

The transmission ECU 21 receives the output signals of the throttle sensor 25 that indicate the throttle opening degree and the output signals of the vehicle speed sensor 29 that indicate the vehicle speed. When it is detected from these signals that the vehicle speed is equal to or higher than a reference speed and the throttle opening degree is at the level corresponding to the fully-closed state of the throttle, the transmission ECU 21 determines that the engine 2 is presently in the idling state and that the vehicle 1 has started decelerating, and the transmission ECU 21 then starts the deceleration flexible lock-up control using the hydraulic pressure control mechanism 13.

At this time, the transmission ECU 21 calculates the slip rate between the input shaft and the output shaft of the lock-up mechanism 32 based on the engine speed signals input from the engine speed sensor 28 and the turbine speed signals input from the turbine speed sensor 30, and the transmission ECU 21 determines, based on the calculated slip rate, whether the lock-up mechanism 32 has failed to be shifted from the full lock-up state to the deceleration flexible lock-up state.

For example, in the case where the lock-up mechanism 32 has been successfully shifted from the full lock-up state to the deceleration flexible lock-up state after the start of deceleration of the vehicle 1 during high-speed cruising, the lock-up clutch 45 is coupled with the front cover 48 at a given coupling pressure, and therefore the engine speed Ne remains at a certain speed that is lower than the turbine speed Nt by a certain amount. However, if the solenoid of the lock-up mechanism hydraulic pressure control circuit 64 has an abnormality, the coupling between the lock-up clutch 45 and the front cover 48 weakens and thus the engine speed Ne sharply drops relative to the turbine speed Nt.

In view of this, the transmission ECU 21 is adapted to determine that the lock-up mechanism hydraulic pressure control circuit 64 has an abnormality if a difference |Ne−Nt| between the engine speed Ne and the turbine speed Nt is larger than an allowable value. If the difference |Ne−Nt| is determined to be larger than the allowable value, the transmission ECU 21 then determines, using the method described below, whether the solenoid of the lock-up mechanism hydraulic pressure control circuit 64 can operate normally.

Further, when it is detected that the engine ECU 22 has started the fuel-cut control, which is the control for suspending the fuel supply to the engine 2, during the deceleration flexible lock-up control, the CPU of the transmission ECU 21 calculates the difference |Ne−Nt| between the engine speed Ne and the turbine speed Nt and determines whether the calculated difference |Ne−Nt| is larger than the allowable value.

In this way, the CPU of the transmission ECU 21 determines whether the lock-up mechanism 32 has failed to be shifted from the full lock-up state to the deceleration flexible lock-up state. That is, the CPU of the transmission ECU 21 diagnoses the solenoid of the lock-up mechanism hydraulic pressure control circuit 64 also when the lock-up clutch 45 and the front cover 48 have failed to be properly coupled with each other due to an abnormality of the solenoid at the start of the fuel-cut control in the vehicle 1.

Further, the CPU of the transmission ECU 21 records in the RAM the number of times the difference |Ne−Nt| has exceeded the allowable value. Thus, the CPU of the transmission ECU 21 counts the number of times the lock-up mechanism 32 has failed to be shifted from the full lock-up state to the deceleration flexible lock-up state (will hereinafter be referred to as "flexible lock-up failure number"). The counted flexible lock-up failure number is compared with a given allowable number stored in the ROM, and if the counted flexible lock-up failure number is larger than the allowable number, the CPU of the transmission ECU 21 executes a forcible full lock-up control that forcibly places the lock-up mechanism 32 in the full lock-up state.

The foregoing allowable number is preferably set to two or more. That is, if the allowable number is two or more, the forcible lock-up control for the abnormality diagnosis of the hydraulic pressure control mechanism 13 is prevented from being executed unnecessarily each time the deceleration flexible lock-up control fails for a reason other than an abnormality of the hydraulic pressure control mechanism 13, such as when the difference |Ne−Nt| between the engine speed Ne and the turbine speed Nt exceeds the allowable value due to a measurement error.

Further, when it is determined that the vehicle 1 has been back in the full lock-up region while the vehicle 1 is traveling and it is determined, based on the difference |Ne−Nt| between the engine speed Ne and the turbine speed Nt, that the lock-up clutch 45 and the front cover 48 are properly coupled with each other, the CPU of the transmission ECU 21 resets the flexible lock-up failure number recorded in the RAM. Thus, the forcible lock-up control is prevented from being executed unnecessarily when the hydraulic pressure control mechanism 13 has no abnormality.

The CPU of the transmission ECU 21 loads various programs for the forcible lock-up control from the ROM and executes the programs to force the lock-up mechanism 32 into the full lock-up state (will be referred to as "forcible lock-up state"). In this way, the CPU of the transmission ECU 21 forcibly shifts the lock-up mechanism 32 from the flexible lock-up state or from the released state to the forcible lock-up state.

Figure 5:
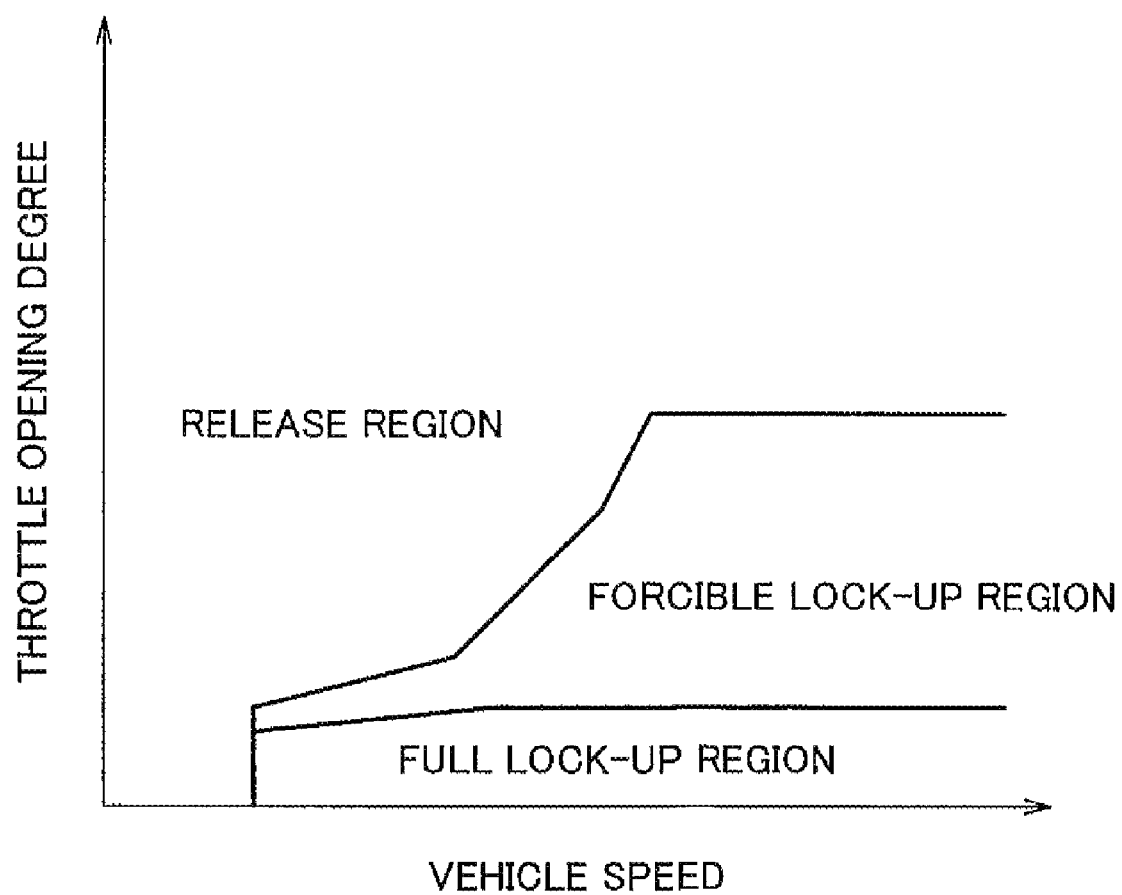
FIG. 5 is a graph schematically illustrating the full lock-up region and the forcible lock-up region which are defined by the vehicle speed and the throttle opening degree.

FIG. 5 is a graph schematically illustrating the full lock-up region and the forcible lock-up region which are defined by the vehicle speed and the throttle opening degree. When the vehicle 1 is normally accelerating, the transmission ECU 21 executes the acceleration flexible lock-up control in order to prevent a booming noise that may otherwise be caused by the coupling between the lock-up clutch 45 and the front cover 48. When it is detected that the vehicle 1 has entered the full lock-up region, the transmission ECU 21 shifts the lock-up mechanism 32 from the flexible lock-up state to the full lock-up state.

Further, when it is detected that the deceleration flexible lock-up control has failed to be executed properly, the transmission ECU 21 places the lock-up mechanism 32 in the full lock-up state also in the forcible lock-up region shown in FIG. 5. That is, in this example embodiment, the full lock-up region is extended such that the lock-up mechanism 32 is placed in the full lock-up state also in regions where the lock-up mechanism 32 is not normally placed in the full lock-up state.

Further, when executing the forcible lock-up control, the CPU of the transmission ECU 21 calculates the slip rate between the input shaft and the output shaft of the lock-up mechanism 32 based on the engine speed signals input from the engine speed sensor 28 and the turbine speed signals input from the turbine speed sensor 30, and then the CPU of the transmission ECU 21 compares the calculated slip rate with the allowable value (allowable slip rate) that is stored in the ROM and thereby determines whether the lock-up clutch 45 is properly coupled with the front cover 48.

More specifically, if it is determined that the slip rate between the input shaft and the output shaft of the lock-up mechanism 32 is higher than the allowable value, the CPU of the transmission ECU 21 determines that the lock-up clutch 45 and the front cover 48 are not properly coupled with each other and that there is an abnormality in the lock-up mechanism hydraulic pressure control circuit 64 that controls the lock-up mechanism 32.

The vehicle 1 may be provided with a warning lamp for indicating an abnormality of the solenoid of the lock-up mechanism hydraulic pressure control circuit 64. In this case, when it is determined that the lock-up clutch 45 is not properly coupled with the front cover 48, the warning lamp is made to blink to warn the driver of the vehicle 1 that the solenoid in the lock-up mechanism hydraulic pressure control circuit 64 has an abnormality Further, the electronic control device 4 may be provided with a non-volatile memory. In this case, the transmission ECU 21 may store, in the non-volatile memory, the information indicating that the lock-up clutch 45 has been determined to have not been shifted to the full lock-up state.

Next, a description will be made of how the abnormality diagnosis of the hydraulic pressure control mechanism 13 is performed when it is detected that the speed that the shift mechanism 11 has been required to establish and the speed that has been actually established at the shift mechanism 11 are different from each other.

The CPU of the transmission ECU 21 is adapted to: control the hydraulic pressure control mechanism 13 based on a map defined by the vehicle speed and the throttle opening degree and stored in the ROM such that a required speed is established at the shift mechanism 11; and identify the speed actually established at the shift mechanism 11 by the hydraulic pressure control mechanism 13 (will hereinafter be referred to as "actual speed") based on the ratio between the turbine speed Nt representing the rotation speed of the input shaft of the shift mechanism 11 and an output shaft rotation speed No representing the rotation speed of the propeller shaft 14 (actual speed ratio).

A speed map indicating the ratio between the turbine speed Nt and the output shaft rotation speed No at each speed is stored in the ROM of the transmission ECU 21. Thus, the CPU of the transmission ECU 21 determines based on the turbine speed Nt, the output shaft rotation speed No, and the speed map, whether the actual speed ratio at the shift mechanism 11 is equal to or lower than a command value. If the actual speed ratio at the shift mechanism 11 is equal to or lower than the command value, the CPU of the transmission ECU 21 determines that the actual speed coincides with the required speed. If it is determined that the actual speed is different from the required speed, the transmission ECU 21 executes the abnormality diagnosis of the hydraulic pressure control mechanism 13 through the forcible lock-up control as it does in response to a failure of the deceleration flexible lock-up control being detected as described above.

In the abnormality diagnosis, the transmission ECU 21 constituted of the CPU and the ROM determines whether the slip rate between the input shaft and the output shaft of the lock-up mechanism 32 is higher than an allowable value. If the slip rate is determined to be higher than the allowable value, the CPU of the transmission ECU 21 determines that the lock-up clutch 45 and the front cover 48 are not properly coupled with each other and thus the duty solenoid (DSL) 74 of the lock-up mechanism hydraulic pressure control circuit 64 for controlling the lock-up mechanism 32 or the transmission solenoid (SR) 86 for turning on and off the common valve 85 has an abnormality. On the other hand, if the slip rate between the input shaft and the output shaft of the lock-up mechanism 32 is determined not to be higher than the allowable value, the CPU of the transmission ECU 21 determines that the transmission solenoid (S4) 81 of the shift operation hydraulic pressure control circuit 65 has an abnormality.

In the case where the shift mechanism 11 is constituted of a main shift portion and a sub-shift portion, the CPU of the transmission ECU 21 may be adapted to identify the actual speed based on an intermediate rotation speed Nc between the main shift portion and the sub-shift portion. In this case, more specifically, the actual speed at the main shift portion is identified based on the turbine speed Nt and the intermediate rotation speed Nc, and the actual speed at the sub-shift portion is identified based on the intermediate rotation speed Nc and the output shaft rotation speed No.

As in the above-described case where the abnormality diagnosis is executed in response to a failure of the deceleration flexible lock-up control, the vehicle 1 may be provided with a warning lamp. In this case, when it is determined that the lock-up clutch 45 is not properly coupled with the front cover 48, the warning lamp is used so as to warn the driver of the vehicle 1 that the solenoid of the lock-up mechanism hydraulic pressure control circuit 64 has an abnormality, and when it is determined that the lock-up clutch 45 is properly coupled with the front cover 48, the warning lamp is used so as to warn the driver of the vehicle 1 that the solenoid of the shift operation hydraulic pressure control circuit 65 has an abnormality.

Further, the transmission ECU 21 may store, in a non-volatile memory, the information indicating the result of the determination as to whether the lock-up clutch 45 has been shifted to the full lock-up state properly. Hereinafter, the operation of the automatic transmission abnormality diagnosis apparatus of this example embodiment will be described.

Figure 6:
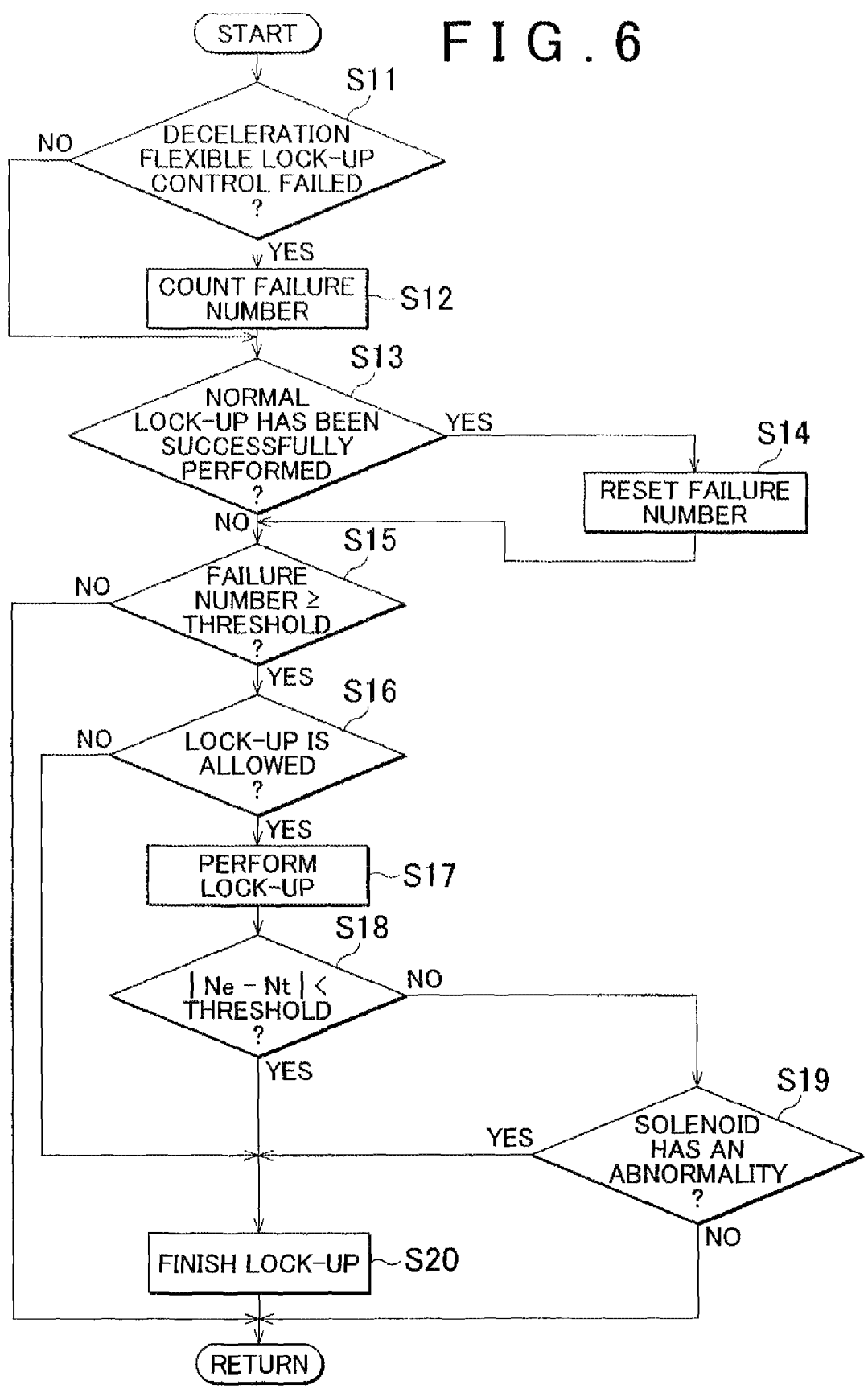
FIG. 6 is a flowchart illustrating a control routine that the automatic transmission abnormality diagnosis apparatus of the example embodiment executes in response to a failure of the deceleration flexible lock-up control.

FIG. 6 is a flowchart illustrating a control routine that the automatic transmission abnormality diagnosis apparatus of this example embodiment executes in response to a failure of the deceleration flexible lock-up control. This control routine is executed by the CPU of the transmission ECU 21 at given time intervals. Note that the control routine is provided as a computer program executable by CPUs.

After the start of the control routine, the transmission ECU 21 first determines whether the deceleration flexible lock-up control has failed (step S11). More specifically, in this step, the transmission ECU 21 determines whether the deceleration flexible lock-up control has failed based on the difference between the engine speed Ne and the turbine speed Nt when the lock-up mechanism is being placed in the flexible lock-up state (e.g., when the vehicle 1 has just entered the flexible lock-up region during deceleration of the vehicle 1 and when the fuel-cut control has just started).

If it is determined that the deceleration flexible lock-up control has failed (step S1: "YES"), the flexible lock-up failure number stored in the RAM is incremented by 1 (step S12).

On the other hand, if it is determined that the deceleration flexible lock-up control has been properly executed (step S11: "NO"), the transmission ECU 21 proceeds to step S13 without incrementing the flexible lock-up failure number.

In step S13, the transmission ECU 21 determines whether the normal lock-up control has been successfully executed. More specifically, in this step, the transmission ECU 21 determines, based on the throttle opening degree and the vehicle speed, whether the vehicle 1 has entered the full lock-up region again from the lock-up release region or from the flexible lock-up region. At this time, if it is determined that the vehicle 1 has not entered the full lock-up region, the transmission ECU 21 then proceeds to step S15. On the other hand, if it is determined that the vehicle 1 has entered the full lock-up region, the transmission ECU 21 controls the lock-up mechanism 32 so as to place the lock-up mechanism 32 in the full lock-up state as it normally is, and then the transmission ECU 21 determines, based on the engine speed Ne and the turbine speed Nt, whether the lock-up mechanism 32 has been successfully placed in the full lock-up state.

If it is determined in step S13 that the normal lock-up control has been successfully executed (step S13: "YES"), the transmission ECU 21 resets the flexible lock-up failure number stored in the RAM (step S14). On the other hand, it is determined in step S13 that the normal lock-up control has failed (step S13: "NO"), the transmission ECU 21 proceeds to step S15 without resetting the flexible lock-up failure number stored in the RAM.

Then, in step S15, the transmission ECU 21 determines whether the flexible lock-up failure number stored in the RAM is equal to or larger than a threshold. If it is determined that the flexible lock-up failure number is less than the threshold (step S15: "NO"), the transmission ECU 21 finishes the control routine.

On the other hand, if it is determined in step S15 that the flexible lock-up failure number is equal to or larger than the threshold (step S15: "YES"), the transmission ECU 21 then determines whether the lock-up mechanism 32 is presently allowed to be applied (step S16). More specifically, in this step, the transmission ECU 21 determines, based on the actual speed established at the shift mechanism 11 and the vehicle speed, whether a condition for applying the lock-up mechanism 32 is presently satisfied. For example, in the case where the lock-up mechanism 32 is adapted to be applied only when the speed at the shift mechanism 11 is the third speed or higher, the transmission ECU 21 determines, in step S16, whether the actual speed is the third speed or higher. Further, for example, the transmission ECU 21 determines whether the engine 2 is presently idling and whether the hydraulic pressure control mechanism 13 is operating to shift the shift mechanism 11.

If it is determined in step S16 that the lock-up mechanism 32 is not presently allowed to be applied (step S16: "NO"), the transmission ECU 21 does not execute the forcible lock-up control to the lock-up mechanism 32 (the processes in step S17 and step S18 described later). In this case, the transmission ECU 21 releases the lock-up mechanism 32 (step S20). For example, the lock-up clutch 45 is released from the front cover 48 in response to the condition for applying the lock-up mechanism 32 becoming unsatisfied in a state where the vehicle 1 is in the flexible lock-up region and the lock-up clutch 45 is coupled with the front cover 48.

On the other hand, if it is determined in step S16 that the lock-up mechanism 32 is presently allowed to be applied (step S16: "YES"), the transmission ECU 21 applies the lock-up mechanism 32 (step S17). More specifically, in this step, the transmission ECU 21 controls the hydraulic pressure control mechanism 13 so as to force the lock-up mechanism 32 into the full lock-up state.

Then, the transmission ECU 21 calculates the difference |Ne−Nt| between the engine speed Ne and the turbine speed Nt and determines whether the calculated difference |Ne−Nt| is smaller than a predetermined threshold (step S18). If it is determined in this step that the calculated difference |Ne−Nt| is smaller than the predetermined threshold (step S18: "YES"), the transmission ECU 21 releases the lock-up mechanism 32, whereby the forcible lock-up control is finished (step S20).

On the other hand, if it is determined in step S18 that the calculated difference |Ne−Nt| is equal to or larger than the predetermined threshold (step S18: "NO"), the transmission ECU 21 then determines, based on a predetermined threshold for determining abnormalities, whether the solenoid for controlling the lock-up mechanism 32 has an abnormality (step S19). If it is determined in this step that the solenoid has an abnormality (step S19: "YES"), the transmission ECU 21 releases the lock-up mechanism 32. On the other hand, it is determined in step S19 that the solenoid has no abnormality (step S19: "NO"), the transmission ECU 21 finishes the control routine. In this way, in this control routine, a preliminary abnormality determination is made in step S18, and a final abnormality determination is made in step S19.

Figure 7:
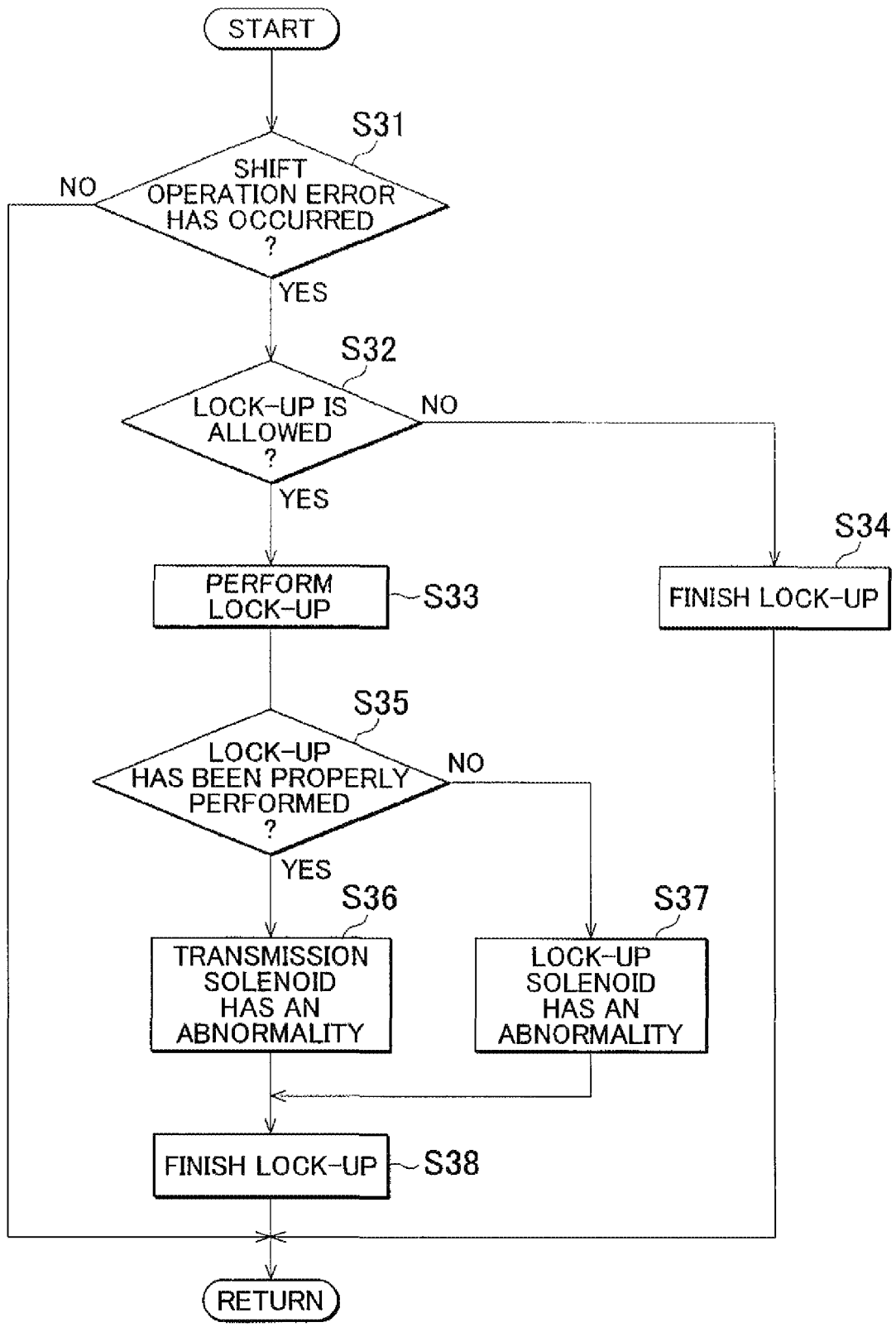
FIG. 7 a flowchart illustrating a control routine that the automatic transmission abnormality diagnosis apparatus of the example embodiment executes in response to a shift operation error.

FIG. 7 is a flowchart illustrating a control routine that the automatic transmission abnormality diagnosis apparatus of this example embodiment executes in response to a shift operation error. The automatic transmission abnormality diagnosis apparatus executes an abnormality diagnosis of the hydraulic pressure control mechanism 13 when it is detected that the speed that is required to be established at the shift mechanism 11 and the actual speed that is actually established at the shift mechanism 11 are different from each other. The control routine is executed by the CPU of the transmission ECU 21 at given time intervals. Note that this control routine is provided as a computer program executable by CPUs.

After the start of the control routine shown in FIG. 7, the transmission ECU 21 first determines whether a shift operation error has occurred (step S31). More specifically, in this step, the transmission ECU 21 controls, based on the throttle opening degree and the vehicle speed, the shift operation hydraulic pressure control circuit 65 such that a required speed is established at the shift mechanism 11, and the transmission ECU 21 then determines, based on the rotation speeds of the input and output shafts of the shift mechanism 11, whether the required speed has been actually established at the shift mechanism 11. If it is determined in step S31 that a shift operation error has not occurred (step S31: "NO"), the transmission ECU 21 finishes the control routine.

On the other hand, if it is determined in step S31 that a shift operation error has occurred (step S31: "YES"), the transmission ECU 21 then determines, based on the actual speed at the shift mechanism 11, the vehicle speed, and so on, whether the lock-up mechanism 32 is presently allowed to be applied (step S32). More specifically, in this step, the transmission ECU 21 determines, based on the actual speed at the shift mechanism 11, the vehicle speed, and so on, whether a condition for applying the lock-up mechanism 32 is presently satisfied. For example, in the case where the lock-up mechanism 32 is adapted to be applied only when the speed of the shift mechanism 11 is the third speed or higher, the conditions for applying the lock-up mechanism 32 may include the actual speed being the third speed or higher, the engine 2 being in an idling state, the hydraulic pressure control mechanism 13 executing no shift control to the shift mechanism 11, etc.

If it is determined in step S32 that the lock-up mechanism 32 is presently allowed to be applied (step S32: "YES"), the transmission ECU 21 applies the lock-up mechanism 32 (step S33). More specifically, in this step, the transmission ECU 21 controls the hydraulic pressure control mechanism 13 so as to force the lock-up mechanism 32 into the full lock-up state.

On the other hand, if it is determined in step S32 that the lock-up mechanism 32 is not presently allowed to be applied (step S32: "NO"), the transmission ECU 21 releases the lock-up mechanism 32 (step S34) and then finishes the control routine.

After applying the lock-up mechanism 32 (step S33), the transmission ECU 21 determines whether the lock-up mechanism 32 has been properly applied (step S35). More specifically, in this step, the transmission ECU 21 calculates the difference |Ne−Nt| between the engine speed Ne and the turbine speed Nt and then determines whether the calculated difference |Ne−Nt| is smaller than a predetermined threshold.

If it is determined in step S35 that the lock-up mechanism 32 has been properly applied (step S35: "YES"), the transmission ECU 21 determines that the shift operation error has been caused by an abnormality of one of the shift solenoids of the lock-up mechanism hydraulic pressure control circuit 64 (e.g., the transmission solenoid (S4) 81) (step S36), after which the transmission ECU 21 releases the lock-up mechanism 32 (step S38).

On the other hand, if it is determined in step S35 that the lock-up mechanism 32 has not been properly applied (step S35: "NO"), the transmission ECU 21 determines that the shift operation error has been caused by an abnormality of the transmission solenoid (SR) 86 (step S37), after which the transmission ECU 21 releases the lock-up mechanism 32 (step S38).

According to the automatic transmission abnormality diagnosis apparatus of the example embodiment that is configured as described above, when the deceleration flexible lock-up state or the shift state has failed to be shifted to a required state, if the vehicle 1 is in a region where the forcible lock-up control can be executed, the abnormality diagnosis is performed in which the lock-up mechanism 32 is placed in the forcible lock-up state and then whether there is any abnormality in the lock-up mechanism hydraulic pressure control circuit 64 or in the shift operation hydraulic pressure control circuit 65 is determined. Thus, abnormalities of the hydraulic pressure control mechanism 13 can promptly detected.

According to the automatic transmission abnormality diagnosis apparatus of the example embodiment, further, because the abnormality diagnosis is performed by executing the forcible lock-up control, the lock-up mechanism 32 can be diagnosed in the full lock-up region where the diagnosis accuracy tends not to be affected by the variation of the slip rate.

While the shift mechanism 11 is constituted of the multiple planetary gearsets and frictional elements for coupling or holding each gear in the automatic transmission abnormality diagnosis apparatus of the example embodiment, the invention is not limited to such configurations. For example, the shift mechanism 11 may be a continuously variable transmission (e.g., belt-drive CVTs). In this case, the transmission ECU 21 determines, from the rotation speeds of the input shaft and the output shaft of the continuously variable transmission, whether the required speed ratio is presently achieved at the continuously variable transmission, instead of determining whether the required speed is presently established at the shift mechanism 11.

Further, while the abnormality diagnosis is performed to detect an abnormality of the transmission solenoid (SR) 86 or the transmission solenoid (S4) 81 in the automatic transmission abnormality diagnosis apparatus of the example embodiment, the invention is not limited to this feature. That is, the solenoids to which the abnormality diagnosis is performed may be arbitrarily set according to the configurations of the lock-up mechanism hydraulic pressure control circuit 64 and the shift operation hydraulic pressure control circuit 65.

As such, the automatic transmission abnormality diagnosis apparatus of the invention provides an advantage that the abnormality diagnosis of the hydraulic pressure control mechanism is more frequently performed, and in particular, the automatic transmission abnormality diagnosis apparatus of the invention can be effectively used for the abnormality diagnosis of a hydraulic pressure control mechanism that performs the flexible lock-up control.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. An abnormality diagnosis apparatus for an automatic transmission having: a lock-up mechanism that is able to mechanically couple an input shaft and an output shaft of a torque converter to each other; a shift mechanism that changes a rotation speed of the output shaft of the torque converter; and a control mechanism that controls the lock-up mechanism and the shift mechanism, the automatic transmission being adapted to operate in a slip state in which the lock-up mechanism mechanically couples the input shaft and the output shaft to each other such that the input shaft and the output shaft are able to rotate relative to each other in a slip region; a full lock-up state in which the lock-up mechanism mechanically couples the input shaft and the output shaft directly to each other in a full lock-up region; and a lock-up release state in which the lock-up mechanism releases mechanical coupling between the input shaft and the output shaft in a lock-up release region, the abnormality diagnosis apparatus comprising:
a full lock-up forcing portion that shifts the lock-up mechanism from the slip state or the lock-up release state to the full lock-up state in a forcible lock-up region that is formed outside of the full lock-up region;
a full lock-up determination portion that determines whether the lock-up mechanism is in the full lock-up state in the forcible lock-up region;
a shift failure determination portion that determines whether the lock-up mechanism has failed to be shifted from the full lock-up state to the desired slip state; and
a shift failure counting portion that counts the number of times failure of shifting has been detected by the shift failure determination portion, wherein
the full lock-up forcing portion forcibly shifts the lock-up mechanism from the slip state to the full lock-up state when the number of times counted by the shift failure counting portion exceeds an allowable number of times.

2. The abnormality diagnosis apparatus according to claim 1, wherein
the full lock-up forcing portion ends the forcibly established full lock-up state immediately after the completion of determination by the full lock-up determination portion.

3. The abnormality diagnosis apparatus according to claim 1, wherein
the number of failures counted is reset when there is a shift from the slip state or the lock-up release state to the full lock-up state in the full lock-up region.

4. An abnormality diagnosis apparatus for an automatic transmission having: a lock-up mechanism that is able to mechanically couple an input shaft and an output shaft of a torque converter to each other; a shift mechanism that changes a rotation speed of the output shaft of the torque converter; and a control mechanism that controls the lock-up mechanism and the shift mechanism, the automatic transmission being adapted to operate in a slip state in which the lock-up mechanism mechanically couples the input shaft and the output shaft to each other such that the input shaft and the output shaft are able to rotate relative to each other in a slip region; a full lock-up state in which the lock-up mechanism mechanically couples the input shaft and the output shaft directly to each other in a full lock-up region; and a lock-up release state in which the lock-up mechanism releases mechanical coupling between the input shaft and the output shaft in a lock-up release region, the abnormality diagnosis apparatus, comprising:

- a full lock-up forcing portion that shifts the lock-up mechanism from the slip state or the lock-up release state to the full lock-up state in a forcible lock-up region that is formed outside the full lock-up region;
- a full lock-up determination portion that determines whether the lock-up mechanism is in the full lock-up state in the forcible lock-up region; and
- a gear determination portion that determines whether an actual speed ratio achieved by the shift mechanism is equal to or lower than a command value issued from a shift controller, wherein if the gear determination portion determines whether the actual-speed ratio is neither equal to nor lower than the command value, the full lock-up forcing portion forcibly shifts the lock-up mechanism from the slip state or from the lock-up release state to the full lock-up state.

5. The abnormality diagnosis apparatus according to claim 4, wherein the control mechanism has: a first solenoid that drives a common valve that is shared by a shift operation hydraulic pressure control circuit for controlling the shift mechanism and a lock-up hydraulic pressure control circuit for controlling the lock-up, a second solenoid that controls a hydraulic pressure of the shift operation hydraulic pressure control circuit; and a third solenoid that controls a hydraulic pressure of the lock-up hydraulic pressure control circuit, and the abnormality diagnosis apparatus further comprises:

an abnormality portion determination portion that determines, based on a result of determination by the full lock-up determination portion, which of the first solenoid and the second solenoid has an abnormality.

6. The abnormality diagnosis apparatus according to claim 4, wherein the full lock-up forcing portion sends the forcibly established full lock-up state of immediately after the completion of the determination by the full lock-up determination portion.

* * * * *